United States Patent [19]

Koutitonsky

[11] Patent Number: 5,562,980

[45] Date of Patent: Oct. 8, 1996

[54] MULTI-LAYER WRAPPER CONSTRUCTION

[75] Inventor: Serge Koutitonsky, St. Lambert, Canada

[73] Assignees: Cartons St-Laurent Inc.; St. Laurent Paperboard Inc., both of Canada

[21] Appl. No.: 333,490

[22] Filed: Nov. 2, 1994

[51] Int. Cl.$^6$ ................ B32B 5/16; B32B 18/00; B32B 27/10

[52] U.S. Cl. ............ 428/324; 428/325; 428/340; 428/514; 428/518

[58] Field of Search ................ 428/518, 340, 428/324, 325, 514

[56] References Cited

U.S. PATENT DOCUMENTS

| | | |
|---|---|---|
| 2,685,571 | 8/1954 | Stinchfield . |
| 3,560,227 | 2/1971 | Eichhorn et al. . |
| 3,920,496 | 11/1975 | Wilkinson et al. . |
| 4,010,307 | 3/1977 | Canard et al. . |
| 4,101,050 | 7/1978 | Buckler et al. . |
| 4,111,349 | 9/1978 | Buckler et al. . |
| 4,130,691 | 12/1978 | Canard et al. . |
| 4,242,418 | 12/1980 | Kitagawa . |
| 4,265,977 | 5/1981 | Kawamura et al. . |
| 4,423,118 | 12/1983 | Corbett et al. . |
| 4,859,527 | 8/1989 | DiStefano . |

*Primary Examiner*—P. C. Sluby
*Attorney, Agent, or Firm*—Howell & Haferkamp, L.C.

[57] ABSTRACT

A multi-layer paper or paperboard construction that has good moisture vapour barrier qualities and mechanical strength and is easily repulpable. The construction permits the use of a very thin PVdC/butyl acrylate barrier layer by primer and laminant layers disposed on the inside surfaces of the paper substrates. The primer and laminant layers are a blend of a inorganic pigment dispersion and a styrene acrylate binder. The multi-layer construction has particular application as a wrapper to protect bulk rolled paper and paperboard prior to shipment from the paper mill and as a linerboard facing in corrugated boxes where liner packaging requires protection against water vapour.

11 Claims, 1 Drawing Sheet

MULTI-LAYER WRAPPER CONSTRUCTION

TECHNICAL FIELD

This invention relates to a multi-layer paper or paperboard construction that has moisture vapour barrier qualities, good mechanical strength and is easily repulpable. The multi-layer construction has particular application as a wrapper to protect bulk rolled paper and paperboard prior to shipment from the paper mill and for linerboard facing in corrugated boxes.

BACKGROUND ART

It is current practice to protect bulk rolled paper and paperboard with a wrapper construction comprising two paper layers between which is sandwiched a moisture vapour barrier. Conventional multi-layer wrappers use low density polyethylene or laminating waxes to provide the requisite moisture vapour barrier qualities.

A major drawback with wax laminated wrappers, however, is that they are difficult to reprocess in conventional repulping operations. Repulping is typically carried out by breaking up the paper product into tiny particles and dissociating the wood fibres from all other materials by flowing the fibres through vibrating screen slots. Contaminants that pass through the screen are subsequently separated from the wood fibres in centrifugal cleaners by differences in specific gravity. Waxes tend to adhere to the wood fibre during the screening process resulting in considerable loss of wood fibre. Waxes themselves are not acceptable materials for reprocessing on a paper machine, as is well known by those familiar with the art of paper making, because their low melting temperature causes deposits to form on paper making machinery. Since screening sequences currently used cannot remove 100% of wax introduced into a system, dispersants and/or solvents are often added to the repulping system to prevent deposition. These additives are expensive and also pose certain problems in terms of toxicity and impact on aquatic life when discharged in a waste stream.

While the use of low density polyethylene and other extruded plastic coatings between two paper or paperboard sheets imparts to the construction a good degree of moisture and vapour barrier protection, such constructions are not easily recyclable. In the repulping stage of the recycling process, the extruded coating tends to separate from the wood fibres into large film pieces. Due to its low density, the film pieces float in the repulper, accumulate around the pulper rotor and plug the screening equipment thus reducing the overall fibre stock preparation process efficiency.

Polyvinylidene chloride (PVdC) is another material which is commonly used as a moisture and vapour barrier. When used in a wet laminating process, it is difficult to achieve a continuous film that provides the moisture and vapour protection specified by the wrapping product end users. Moreover, because PVdC is partially soluble in water, it requires high applied weights to achieve an acceptable level of moisture and vapour protection. The high unit cost of PVdC makes the use of high applied weights not economically viable. Another problem with using high applied weights of PVdC is the negative impact on the environment. Although PVdC dissociates easily from the wood fibres, its chlorine content causes problems in terms of impact on aquatic life when discharged from a recycling facility into a waste effluent stream.

Efforts have been made to reduce the amount of PVdC necessary to achieve adequate moisture and vapour barrier qualities. It is known to coat a thin film of PVdC with polyethylene or polypropylene and to apply the film to the paper substrate. However, the use of polyethylene or polypropylene reduces the repulpability of the product for the reasons stated above.

DISCLOSURE OF THE INVENTION

It is an object of the present invention to provide a multi-layer wrapper construction having good moisture vapour barrier qualities and mechanical strength and be recyclable with conventional repulping processes. By the use of appropriate primer and laminant materials, the PVdC barrier layer can be applied at a very low rate enhancing recyclability without impairing its barrier qualities.

Thus in accordance with the present invention, there is provided a recyclable multi-layer moisture vapour barrier construction comprising a first paper or paperboard substrate having an inner and outer surface; a primer layer disposed on the inner surface of said first paper or paperboard layer, said primer layer comprising an inorganic pigment and a synthetic organic binder; a moisture vapour barrier layer disposed on the primer layer, said barrier layer comprising a blend of PVdC and butyl acrylate copolymer; a laminant layer disposed on the barrier layer, said laminant layer comprising an inorganic pigment and a synthetic organic binder; and a second paper or paperboard substrate having an inner and outer surface, said inner surface being disposed on the laminant layer.

In accordance with another aspect of the invention, there is provided a method of preparing a recyclable multi-layer moisture vapour barrier construction comprising the steps of coating a surface of a first paper or paperboard substrate with a primer layer comprising a blend of an inorganic pigment dispersion and a synthetic organic binder emulsion and drying said primer layer; coating the surface of said primer layer with a moisture vapour barrier layer comprising a blend of PVdC and butyl acrylate copolymer and drying said barrier layer; coating the surface of said barrier layer with a laminant layer comprising a blend of an aqueous dispersion of an inorganic pigment dispersion and a synthetic organic binder emulsion; laminating a second paper or paperboard substrate to said laminant layer by the application of pressure and heat.

Preferred inorganic pigments in the primer layer are those having about 90% of its particle size below 2 microns and those exhibiting a thin platelet structure of relatively large diameter to thickness ratio and having a size between about 200–400 mesh. Suitable non-platelet like inorganic pigments include clay and calcium carbonate. Suitable platelet like inorganic pigments include delaminated clay, talc and mica. Preferred inorganic pigments in the laminant layer have a particle size below about 15 microns including clay and calcium carbonate. A preferred synthetic organic binder in the primer and laminant layers is styrene acrylate. The present invention provides good moisture vapour barrier qualities with the PVdC containing barrier layer applied at a rate as low as about 3 gsm, and good repulpability.

DETAILED DESCRIPTION OF THE INVENTION

Figure 1:
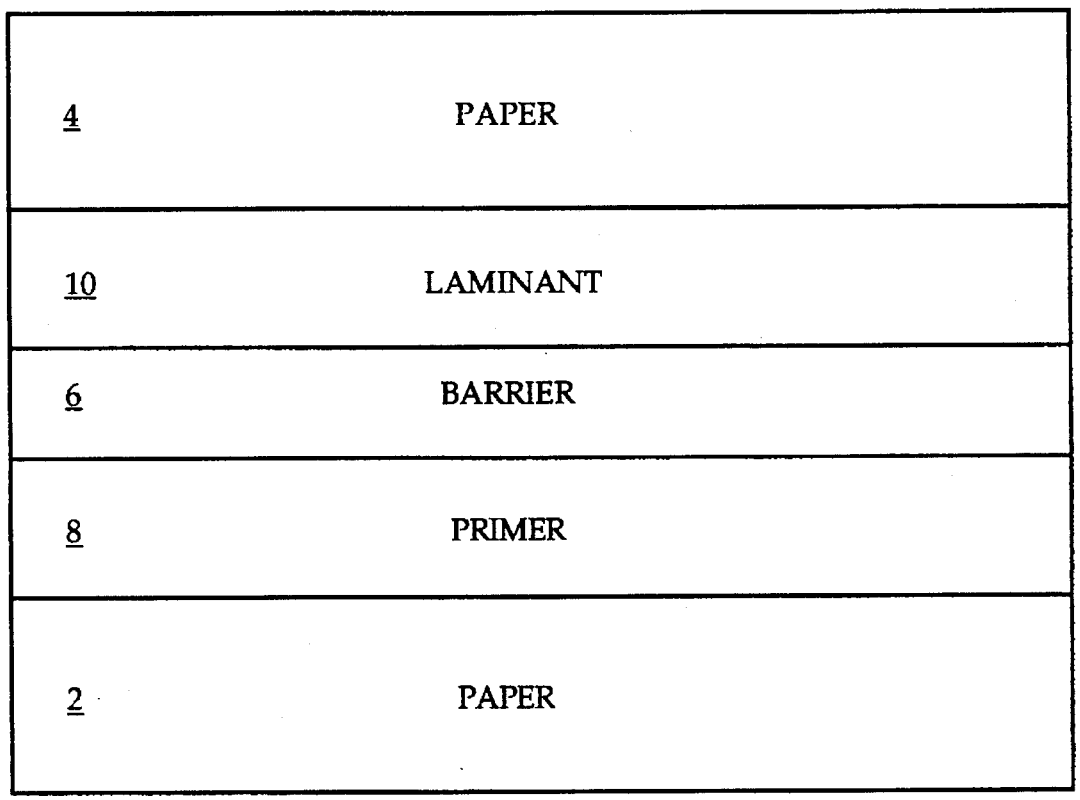

The invention comprises a multi-layer wrapper construction as disclosed in the FIGURE. The multi-layer construction incorporates two outer mechanically stable substrates 2, 4, which are formed of high grade paper or paperboard stock. Their basis weights can vary depending on the end use application, however a basis weight in the range of about 50 to 205 grams per square meter is suitable for use in a wrapper for bulk rolled paper and paperboard.

Barrier layer 6 is interposed between paper layers 2 and 4 and provides the moisture vapour barrier characteristics of the multi-layer wrapper construction. Barrier 6 is a copolymer of a major portion of PVdC and a minor portion of butyl acrylate. The presence of butyl acrylate in the blend promotes adhesion of the barrier to the substrate. The particular butyl acrylate and the ratio of PVdC to butyl acrylate should be such as to impart just sufficient tackiness to the material to permit even coating of an effective barrier layer on primer layer 8 by conventional application techniques, but not so much as to impair the repulpability of the construction. In practice, the PVdC/butyl acrylate copolymer should exhibit a minimum film forming temperature in the range of about 12° to 18° C.

Primer layer 8 and laminant layer 10 each is a blend of an inorganic pigment and a synthetic organic binder. A suitable synthetic organic binder is styrene acrylate. The particular styrene acrylate used should have sufficient tackiness to effectively bind the inorganic pigment particles but not so much as to affect repulpability. In practice, the styrene acrylate should exhibit a glass transition temperature in the range of about 20° to 25° C. Pigment/binder ratios from about 75/25 to 80/20 based on 100 parts total solids are preferred. Substantially higher pigment-binder ratios render the construction more permeable to moisture vapour. Substantially lower pigment-binder ratios increase penetration into the substrate thereby decreasing recyclabilty.

For primer layer 8, suitable inorganic pigments have at least about 90% of their particle size finer than 2 microns and include clay and calcium carbonate. Other suitable pigments are those exhibiting a thin platelet structure of relatively large diameter to thickness ratio including delaminated clay, talc and mica having a mesh size of from about 200–400. For laminant layer 10, suitable inorganic pigments have a particle size finer than about 15 microns and include clay and calcium carbonate.

Conventional coating and laminating techniques can be used to form the multi-layer wrapper product of the present invention. Primer layer 8 can be applied in the form of a blend of an inorganic pigment dispersion and a synthetic organic binder emulsion. While the solids contents of the primer layer components can vary, high dilution levels will cause large amounts of water to be absorbed into the paper substrate increasing the energy and time required to dry the multi-layer construction. In practice, a suitable solids content of the primer layer is in the range of about 60 to 70%. Primer layer 8 is applied onto paper substrate 2 using conventional rod and blade coating heads or by cast coating transfer techniques at a rate of about 5 to 15 grams per square meter (gsm) on a dry applied weight basis, with 10 gsm being preferred, followed by a drying stage. The water resistance of the primed paper substrate as defined by the Cobb size test should be controlled not to exceed 30 gsm/5 minutes in order to allow enough time for subsequently applied barrier layer 6 to coalesce and form a pinhole free film prior to lamination as described below.

After primer layer 8 has been dried, barrier layer 6 is applied onto primer layer 8. Barrier layer 8 can be applied in the form of an emulsion at a rate of about 3 to 10 gsm on a dry applied weight basis. The emulsion can be applied using conventional techniques known to be effective for non-pigmented coatings including rod, gravure, air knife or reverse roll application. After barrier layer 6 is applied, it is subjected to a drying stage.

After barrier layer 6 is dried, laminant layer 10 is applied onto barrier layer 6 using a conventional rod and blade coating heads or by cast coating transfer techniques at a rate of about 5 to 15 grams per square meter (gsm) on a dry applied weight basis, with 10 gsm being preferred. As barrier layer 6 is dried before laminant layer 10 is applied, the water resistance imparted to paper substrate 4 by laminant layer 10 is less critical than that imparted to paper substrate 2 by primer layer 8. Accordingly, some cost savings can be realized by using an inorganic pigment having a larger mean particle size than the very fine particle sizes used in primer layer 8.

Paper substrate 4 is wet laminated to laminant layer 10 using the application of pressure and heat. The multi-layer construction web can be passed through conventional high pressure nip rolls following which the construction can be dried by passing the web around steam heated cylinders known in the art as can dryers. In order to ensure the integrity of barrier layer 6, the nip pressure should be controlled to a maximum of about 100 pounds per linear inch (pli) and the drying temperature should be controlled so as not to cause melting of the applied coatings. In practice, the maximum sheet temperature should not exceed the evaporation temperature of water.

The high moisture vapour barrier properties and recyclability of the multi-layer wrapper construction of the present invention is clearly demonstrated in the examples outlined in Table I.

TABLE I

|  | Multi-layer | | Polyethylene | | Wax | |
|---|---|---|---|---|---|---|
| Applied Weight (gsm) | 25 | 40 | 16 | 30 | 34 | 52 |
| Screen Reject (%) | 0.1 | 0.5 | 5.9 | 10.6 | 7.3 | 11.1 |
| WVTR (gsm/day) | 10 | 5 | 28 | 14 | 29 | 10 |

Table 1 provides a comparison of water vapour transmission properties and the recyclability of the multi-layer construction in accordance with the present invention as against similar constructions using polyethylene and wax as the barrier material. The construction identified as "Multi-layer" in Table I is a preferred embodiment of the present invention. Paper substrates 2 and 4 were 127 gsm paperboard. The primer layer 6 consisted of a blend of a clay dispersion sold under the trade mark ULTRA GLOSS 90 by Engelhard Corporation with a styrene acrylate emulsion produced by Creative Chemicals Company under the trademark AC-96. The clay dispersion is a very fine kaolin based coating grade dispersion having 96%–100% of its particle size finer than 2 microns and a solids content of about 70%. The styrene acrylate emulsion has a 50% solids content and the styrene acrylate has a glass transition temperature of 22° C. The blend comprised 70% by weight on a wet basis of the inorganic pigment dispersion and 30% by weight on a wet basis of styrene acrylate emulsion. Barrier layer 6 was applied in the form of an emulsion having a 50% solids content and consisted of a PVdC/butyl acrylate copolymer produced by Creative Chemicals Company under the trade mark PV-1. The copolymer comprises 92 parts per 100 parts on a dry weight basis of PVdC and 8 parts per 100 parts by weight of butyl acrylate and has a minimum film forming temperature of about 16° C. Laminant layer 10 was the same as primer layer 8 except the inorganic pigment was an intermediate fraction kaolin based coating grade pigment having 78–84% of its particle size finer than 2 microns. In the 25 gsm applied weight example, the barrier layer was applied at a nominal rate of about 5 gsm and the primer and laminant layers were each applied at a nominal rate of about 10 gsm. In the 40 gsm applied weight example, the barrier layer was applied at a nominal rate of about 10 gsm and the primer and laminant layers were each applied at a nominal rate of about 15 gsm. Primer layer 8 and laminant layer 10 were applied by conventional rod and blade coating heads and barrier layer 6 was applied with a conventional rod coater. The second paperboard substrate was laminated to laminant layer 10 by passing the web through pressure nip rolls followed by passing the web around steam heated can dryers.

The constructions identified as "Polyethylene" in Table I were each a single extruded layer of polyethylene between the same paper stock used in the examples of the present invention, in 16 and 30 gsm applied laminant weights. The constructions identified as "Wax" in Table I were each a single layer of laminating wax applied with a conventional rod coater succeeded by a pressure nip for lamination between the same paper stock used in the examples of the present invention, at 34 and 52 gsm applied laminant weights.

The degree of recyclability was determined by repulping the examples in Table I in a Tappi disintegrator for 40 minutes at 45° C. and 3% consistency. "Consistency" is defined as the oven dried mass of fibres and contaminants divided by the wet mass of fibres plus water in the pulper. The beaten pulp was processed through vibrating 0.006" slotted screens and the weight of rejects retained on the screens was measured. During repulping, the coating layer materials are dissociated from the wood fibres. The wood fibres and contaminants including particles of coating materials pass through the vibrating screen slots. The wood fibres are separated from heavier contaminants downstream in a centrifugal cleaner. As can be seen from the results in Table I, both the 25 gsm and 40 gsm examples of the present invention display good recyclability, leaving only 0.1% and 0.5% of the coating material on the screen as rejects. The barrier, primer and laminant layer materials that are largely reduced to particles having a size below 0.006" and pass through the screen have a specific gravity of at least 1.5 gm/cc and are therefore readily separated in centrifugal cleaners from the wood fibres that have a specific gravity of varying from 0.7 gm/cc to 1.04 gm/cc. The polyethylene and wax examples leave unacceptably high amounts of contaminants on the screens, causing clogging of the slots, and are not recyclable. Both of these latter two materials have specific gravities below 1.00 gm/cc and accordingly are not separable from the wood fibres in centrifugal cleaners.

The moisture vapour transmission characteristics of the examples in Table I were determined by the water vapour transfer rate (WVTR) test procedure described in Tappi T 523 om-87 which involves exposing one side of each construction to 90% relative humidity and the other side to 5% relative humidity, and measuring the rate of transmission of water vapour in grams per square meter per 24 hour period. The results in Table I show that the construction in accordance with the present invention offers lower moisture vapour transmission at lower applied weights than the polyethylene and wax examples.

The extremely good WVTR results for the examples of the present invention shown in Table I are wholly unexpected. Similar WVTR tests were performed on paper substrate 2 coated with primer layer 8 and barrier layer 6. The tests results showed a transmission rate of between about 30–50 gsm/day. As paper substrate 4 coated with laminant 10 is virtually completely transparent to water vapour, it is highly surprising that the combination of the layers into the multi-layer construction of the present invention offers vapour barrier characteristics in the range of 5–10 gsm/day. Without being bound by any theory, it is believed that the steps of applying pressure in laminating paper substrate 4 to laminant layer 10 and the application of heat to dry the construction effects a physical change in barrier layer 6 which accounts for the enhanced WVTR results.

The use of primer layer 8 comprising very fine grade inorganic pigments or inorganic pigments having a plate-like aspect ratio provides a very smooth closed out surface to reduce barrier layer penetration into the paper substrate and promotes good adhesion of the barrier layer permitting the PVdC containing barrier layer to be applied at very low rates. This avoids the problem of direct application of the PVdC barrier layer to paper substrates which require unacceptably high application rates to ensure a uniform continuous layer having the requisite degree of moisture vapour resistance. As noted earlier, not only are such high application rates commercially unattractive due to the high cost of the PVdC emulsion, high application rates of the chlorine containing PVdC can lead to environmental problems when repulped. In addition, the conventional use of a polyethylene or polypropylene film as a carrier for the PVdC barrier which reduces repulpability is avoided. The pigment content also ensures that applied layers are easily broken up in repulping operations.

I claim:

1. A recyclable multi-layer moisture vapour barrier construction comprising:
   (a) a first paper or paperboard substrate having an inner and outer surface;
   (b) a primer layer applied on the inner surface of said first paper or paperboard layer, said primer layer comprising an inorganic pigment and a styrene acrylate copolymer binder;
   (c) a moisture vapour barrier layer applied on the primer layer, said barrier layer comprising a copolymer of polyvinylidene chloride and butyl acrylate, the polyvinylidene chloride being present in an amount greater than that of the butyl acrylate;
   (d) a laminant layer applied on the barrier layer, said laminant layer comprising an inorganic pigment and a styrene acrylate copolymer binder;
   (e) a second paper or paperboard substrate having an inner and outer surface, said inner surface being applied on the laminant layer.

2. The multi-layer construction of claim 1 wherein the polyvinylidene chloride/butyl acrylate copolymer has a minimum film forming temperature in the range of 12° to 18° C.

3. The multi-layer wrapper construction of claim 1 wherein the inorganic pigment particles in the primer layer have a thin platelet structure and a size in the range of about 200–400 mesh.

4. The multi-layer construction of claim 3 wherein the inorganic pigment is selected from the group consisting of delaminated clay, talc and mica.

5. The multi-layer wrapper construction of claim 1 wherein the inorganic pigment in the primer layer has at least about 90% of its particle size finer than 2 microns.

6. The multi-layer wrapper construction of claim 1 wherein the inorganic pigment in the laminant layer has a particle size finer than 15 microns.

7. The multi-layer wrapper construction of claim 1 wherein the styrene acrylate copolymer binder has a glass transition temperature in the range of 20° to 25° C.

8. The multi-layer wrapper construction of claim 7 wherein the styrene acrylate has a glass transition temperature in the range of 20° to 25° C.

9. The multi-layer construction of claim 1 wherein the inorganic pigment in the primer and laminant layers is present in the range of about 75–80 parts per 100 parts on a dry weight basis.

10. The multi-layer construction of claim 1 wherein the barrier layer is applied at a rate in the range of 3 to 10 gsm and the primer and laminant layers are each applied at a rate in the range of 5 to 15 gsm.

11. A recyclable multi-layer moisture vapour barrier wrapper construction comprising:

(a) a first paper or paperboard substrate having inner and outer surface;

(b) a primer layer applied on the inner surface of said first paper or paperboard layer, said primer layer comprising about 75–80 parts per 100 parts by dry weight of an inorganic pigment having at least 90% of its particle size below 2 microns and about 20–25 parts per 100 parts by dry weight of a binder of styrene acrylate copolymer having a glass transition temperature in the range of 20°–25° C., said primer layer being applied at a rate of about 10 to 15 gsm;

(c) a moisture vapour barrier layer applied on the primer layer, said barrier layer comprising a copolymer of a relatively major amount of polyvinylidene chloride and a relatively minor amount of butyl acrylate and having a minimum film forming temperature in the range of 12° to 18° C., said barrier layer applied at a rate of about 3 to 10 gsm;

(d) a laminant layer applied on the barrier layer, said laminant layer comprising about 75–80 parts by dry weight of an inorganic pigment having a particle size below about 15 microns and about 20–25 parts per 100 parts by dry weight of a binder of styrene acrylate copolymer having a glass transition temperature in the range of 20°–25° C., said laminant layer being applied at a rate of about 10 to 15 gsm;

(e) a second paper or paperboard substrate having an inner and outer surface, said inner surface being applied on the laminant layer.

* * * * *